United States Patent
Bud et al.

(10) Patent No.: US 11,235,613 B2
(45) Date of Patent: Feb. 1, 2022

(54) DOCUMENT AUTHENTICATION BY ATTITUDE-INDEPENDENT DETERMINATION OF SURFACE APPEARANCE USING CONTROLLED ILLUMINATION

(71) Applicant: iProov Ltd., London (GB)

(72) Inventors: Andrew Bud, London (GB); Andrew Newell, London (GB); Gemma Bird, London (GB)

(73) Assignee: iProov Ltd., London (GB)

( * ) Notice: Subject to any disclaimer, the term of this patent is extended or adjusted under 35 U.S.C. 154(b) by 95 days.

(21) Appl. No.: 16/842,671

(22) Filed: Apr. 7, 2020

(65) Prior Publication Data

US 2020/0316979 A1    Oct. 8, 2020

Related U.S. Application Data

(60) Provisional application No. 62/831,033, filed on Apr. 8, 2019.

(51) Int. Cl.
| | | |
|---|---|---|
| *B42D 25/328* | (2014.01) | |
| *G06T 7/77* | (2017.01) | |
| *G06K 9/00* | (2006.01) | |
| *G06K 9/20* | (2006.01) | |

(Continued)

(52) U.S. Cl.
CPC ....... *B42D 25/328* (2014.10); *G06K 9/00456* (2013.01); *G06K 9/00483* (2013.01); *G06K 9/2036* (2013.01); *G06T 7/77* (2017.01); *G07D 7/0032* (2017.05); *G07D 7/17* (2017.05)

(58) Field of Classification Search
CPC ...... B42D 25/328; G07D 7/0032; G07D 7/17; G06T 7/77; G06K 9/00456; G06K 9/00483; G06K 9/2036
See application file for complete search history.

(56) References Cited

U.S. PATENT DOCUMENTS

| | | |
|---|---|---|
| 7,925,096 B2 | 4/2011 | Baxter et al. |
| 9,075,975 B2 | 7/2015 | Bud |
| 9,412,169 B2 | 8/2016 | Bud et al. |

(Continued)

FOREIGN PATENT DOCUMENTS

| | | |
|---|---|---|
| CN | 110046644 A | 7/2019 |
| EP | 3432278 A1 | 3/2017 |

OTHER PUBLICATIONS

Mike Butcher, IDnow Scans Holograms in ID Cards to Verify Your Identity Online, TechCrunch, Jun. 18, 2014.

*Primary Examiner* — Casey L Kretzer
(74) *Attorney, Agent, or Firm* — Oliver Strimpel

(57) ABSTRACT

A user is guided to move a device equipped with an illuminator and a camera with respect to a document whose genuineness is to be assessed. The motion includes changing the distance between the device and the document by moving the device or moving the document. Imagery of the document is captured during the movement and analyzed to determine a likelihood that the document includes features indicative of genuineness, such as a hologram, an original photograph, and other regions matching those of a genuine document. The analysis may include identifying regions exhibiting large changes in appearance over relatively small distance changes which characterize holograms, and obtaining the spatial extent of document features.

11 Claims, 1 Drawing Sheet

(51) Int. Cl.
*G07D 7/00* (2016.01)
*G07D 7/17* (2016.01)

(56) References Cited

U.S. PATENT DOCUMENTS

| | | | |
|---|---|---|---|
| 10,140,494 | B1 | 11/2018 | Lawandy et al. |
| 2010/0328741 | A1 | 12/2010 | Cheverton et al. |
| 2012/0281880 | A1* | 11/2012 | Rhoads .................. G07F 7/125 382/103 |
| 2015/0090777 | A1 | 4/2015 | Cho et al. |
| 2015/0256695 | A1* | 9/2015 | Showering ......... H04N 1/00774 358/505 |
| 2016/0378061 | A1 | 12/2016 | Reinhardt |
| 2017/0132465 | A1 | 5/2017 | Kutter et al. |
| 2017/0355214 | A1 | 12/2017 | Okada et al. |
| 2018/0005027 | A1 | 1/2018 | Touret et al. |
| 2018/0091672 | A1 | 3/2018 | Aiello et al. |
| 2018/0211243 | A1* | 7/2018 | Ekpenyong ............ H04N 5/232 |
| 2019/0012868 | A1 | 1/2019 | Okada et al. |

\* cited by examiner

DOCUMENT AUTHENTICATION BY ATTITUDE-INDEPENDENT DETERMINATION OF SURFACE APPEARANCE USING CONTROLLED ILLUMINATION

CROSS REFERENCE TO RELATED APPLICATION

This application claims right of priority to and the benefit under 35 U.S.C. § 119(e) of U.S. provisional patent application Ser. No. 62/831,033, filed Apr. 8, 2019.

BACKGROUND

The verification of the true identity of a natural person is becoming essential in an increasing range of contexts. Anti-money laundering regulations require that large transactions, privileged operations and the opening of financial services accounts be attributed to persons whose identities have been adequately established. Security concerns require that persons travelling or entering sensitive installations should not conceal their true identities, so that their past records may first be scrutinized.

The most generally accepted source of evidence of the true identity of a person is that issued by governments. In order to issue passports or national identity cards, governments require trusted documentation, adequate corroboration and, if necessary, investigation. In countries where national identity cards do not exist, such as the United States, the Real ID act places reliance on the driving license, and a substantial obligation of due diligence is placed on the Motor Vehicle or Driver administrative bodies that issue driving licenses.

Thus, the physical possession of a government-issued identity document (ID) such as a passport, identity card or high-trust driving license is generally considered a trustworthy corroboration of the identity asserted by an individual.

In a number of countries, digital identities are being created with the aspiration of being used instead of physical documents. In the European Union, the eIDAS Regulations permit the use of compliant digital identities throughout the member states. Normally, to establish an eIDA digital identity in the first place, a person must present themselves together with their government issued identity document.

The trust vested by the relying party in such a document depends on the document itself being genuine and unfalsified. For this reason, governments have for centuries invested in increasingly sophisticated methods of printing and laminating such documents, in a race to keep ahead of the increasing sophistication of forgers. In the last decade electronic means have been added, with the insertion of microchips into documents complying with the ICAO 9303 standard. Such micro-chips contain the information printed in the document, plus a digital certificate signed by the issuing authority. Under current cryptographic practice, such certificates are considered impossible to forge and hence represent the best possible guarantee of the authenticity of the information contained in the chip, which is readable contactlessly using NFC technology.

However, there are many circumstances in which such a chip is absent, or the means to read it are unavailable. For this reason, physical means to confirm authenticity remain important. There are three main measures employed. The first is security printing, which embeds layers of pattern in the printed document. Imperfect copies are exposed by distortions, errors or erasures in such patterns. The second is spectrographic response, which determines the way the document responds to illumination by ultra-violet light. The third method is to embed or emboss a holographic element in the document, whose reflective properties, in terms of color, directionality and intensity and combinations thereof are highly characteristic. Typical examples are holograms embedded in credit cards, and holographic embossing in the surface of driving licenses. Normally, such embossing includes or covers the identity photograph found on practically all identity documents.

There is an increasing requirement to check the identity of an individual remotely and automatically. In-person identity checks require space in an accessible location and consume employee time. Above all, they are inconvenient for the user, who must travel to the checking location and invest appreciable amounts of time in the process. They are increasingly reluctant to do so, as the process confers no direct value in return for the investment of their time. Organizations able to permit users to prove their identity remotely, preferably on their now-ubiquitous smartphones, gain an immediate competitive advantage.

Early methods of remote identity checking required users to engage in a live video call with an agent, who would interview the person to ensure they were genuinely present humans, then examine the document via the video link, to establish its authenticity. This method, still widely mandated in the financial services regulations of many countries, has a number of drawbacks; it is very costly, requiring an employee to talk with the person for some minutes. It is also ineffective in security terms, as it is difficult for an employee to determine if the document has been forged or modified based just on the imagery available from a video call. The fine details embedded in security printing are not visible, and the correctness of the holograms cannot be adequately assessed.

There is therefore a need to provide means to assess the authenticity of an identity document remotely, using the devices available to members of the public alone, in an automated, reliable and fast way in order to minimize cost, minimize the time required, and maximize the reliability of the result.

SUMMARY

The described methods and systems involve changing the distance between a device equipped with an illuminator and/or screen and a camera with respect to a document whose genuineness is to be determined. Changes in appearance of the document in imagery captured during the motion are analyzed to assess whether the document is genuine.

In general, in one aspect, a method of determining whether a document is genuine comprises: illuminating the document with a controlled illumination source which is in a fixed spatial relationship with a camera; changing the distance between the camera and a centroid of the document; using the camera to capture imagery of the document while changing the distance between the camera and the centroid of the document; analyzing the captured imagery to obtain information about changes in appearance of a surface of the document resulting from: changes in illumination incident on the document caused by changing a position of the controlled illumination source with respect to the document; and changes in a position of the camera with respect to the document caused by the changing of the distance between the centroid of the document and the camera; and analyzing the information about changes in appearance of the document to determine a likelihood that the captured imagery was captured from a genuine document.

Various embodiments include one or more of the following features. The distance between the camera and the centroid of the document is changed by moving one of the camera and the document along a linear trajectory. An angle between the linear trajectory and a plane of the document is less than 90 degrees. The distance between the camera and the centroid of the document is changed by moving one of the camera and the document along a curved trajectory. The camera and the controlled illumination source are components of a mobile device, the distance between the camera and a centroid of the document is changed by a user of the mobile device, and the user of the mobile device is instructed to move the device while keeping an image of the document displayed on a screen of the device within a specified region on the screen. Using the mobile device to displace the image of the document displayed on the screen of the device such that the user of the mobile device causes the mobile device to move in a desired trajectory corresponding to a trajectory in which the user of the mobile device keeps the image of the document displayed on the screen of the device within the specified region on the screen. The captured imagery includes imagery of a photograph within the document, and the step of analyzing the information about changes in appearance of the surface of the document includes analyzing changes in reflections from the photograph to determine a likelihood that the captured imagery of the photograph was captured from a photograph that is not an altered photograph or a replacement photograph. The captured imagery includes imagery of a region adjacent to a photograph appearing within the document, and the step of analyzing the information about changes in appearance of the surface of the document includes analyzing changes in reflections from the region adjacent to the photograph to determine a likelihood that the region adjacent to the photograph was affected by at least one of alteration of the photograph and replacement of the photograph. The controlled source of illumination comprises a display screen. The display screen displays a pattern. The display screen displays a changing pattern that is controlled by at least one of a device local to the document and a remote server in data communication with a device local to the document that houses the display screen.

In general, in another aspect, a method of determining whether a document is genuine comprises: illuminating the document with a controlled illumination source which is in a fixed spatial relationship with a camera; while changing a spatial arrangement of at least one of an intensity and a color of the controlled source of illumination, capturing imagery of the document; analyzing the captured imagery to obtain information about an appearance of the document, wherein the analysis includes analyzing reflections of illumination from the controlled source of illumination; and using the information about the appearance of the document to determine a likelihood that the reflections of illumination were received from a genuine document.

Various embodiments include one or more of the following features. The controlled source of illumination is a display screen controlled by a device local to the document. The controlled source of illumination is a display screen controlled by signals received from a remote server in data communication with a device housing the display screen that is local to the document.

DETAILED DESCRIPTION

Figure 1B:
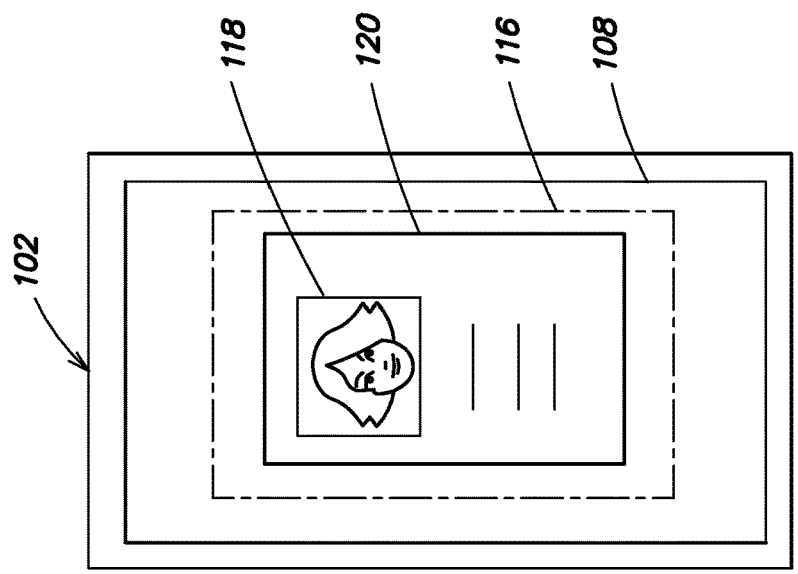
FIG. 1B illustrates a display of the smartphone shown in FIG. 1A showing imagery to guide a user to move the smartphone along a desired trajectory.

Various methods and products exist to assess the authenticity of identity documents and the information printed on them based on imagery taken by normal smartphone cameras. These cameras include sensors sensitive to the visible light as well as the near infrared. Modern smartphones are equipped with infra-red illuminators, and hence response analysis in the infra-red in addition to the visible is possible to some extent. Measures to assess the authenticity of printed information contained within a document include analysis of the details of the typefaces and their layouts, together with the background security printing.

In most cases, the only means to link an identity document to its holder, other than by the mere fact of physical possession, is the photograph on the document. Only if the images match can the relying party consider that the identity attributes printed on the document apply to the physical person making the request for verification. An identity document can be adulterated by changing or substituting the photograph. A perfectly genuine photo ID, which is perfect in all other respects, can by photo substitution become a means to enable impersonation. Therefore, the photo is a crucial vulnerability in the process of remotely verifying the identity of a person using their identity document.

Assessing the authenticity of the photo on a photo ID using only a smartphone is a difficult problem. In tests undertaken by banks of many market-leading smartphone-based document capture apps, none of the apps detected the replacement of the photograph in a photo ID with another photograph. A few methods have been suggested in the literature or offered commercially, but take-up has not been widespread. These methods rely on the use of the document hologram to check the integrity of the document. They test the hologram by requiring the user to repeatedly tilt the identity document around a vertical axis in a plane approximately perpendicular to the central axis of the camera, i.e., parallel to the plane of the smartphone running from the center of the top side to the center of the bottom side of the document. The smartphone is to be held motionless while the document is tilted. The ambient light reflects from the embossed hologram and is detected by the smartphone camera.

A disadvantage of this method is that it requires the user to follow an instruction to move the identity document in a very specific manner that may be hard to follow. Further, it may fail to fully expose certain details of the hologram.

While the following description refers to the use of a personal device, and particularly a smartphone, other personal devices, such as a tablet, or a laptop or other form of personal computer may also be used. The methods depend in part on whether the personal device is equipped with a rear-facing camera and illuminator or only with a front-facing camera and no flash illuminator. We describe the former case first.

In one embodiment, referred to herein as axial scanning, the user is required to change the distance between the device and the document along an axis perpendicular to the plane of the document. This is accomplished by one of the following: moving the device with respect to a stationary document; moving the document with respect to the stationary device; and moving both the device and the document. The motion causes the distance between the smartphone and the centroid of the document to change. In one implementation, the document is laid flat on a surface, and the smartphone is moved towards or away from the document along a straight-line trajectory. Non-orthogonal linear trajectories may be deployed in addition to orthogonal ones, such as trajectories that retain an initially non-centered feature of the document, such as a photograph or a hologram, within a field of view of the device camera while changing the distance between the device and the document. More complex trajectories, including curved trajectories, and trajectories with more than one change of direction of the device or document may be used as well as or instead of straight-line trajectories. The user may be directed to change the orientation of the device, i.e., to rotate it about an axis corresponding to the line between the camera sensor and the document centroid or the centroid of a region of interest of the document. When the camera axis is aligned with an axis orthogonal to and passing through (or close to) the centroid of the document, such azimuthal motion of the device occurs in a plane parallel to the plane of the document. Such rotation may be combined with the translational motion described above. Other changes in the orientation of the device may be implicitly elicited as a result of the requirement that the device camera continues to point to the document, or to a specific field of interest in the document, while being moved along the desired trajectory. Thus, certain implementations in which the device is moved may involve attitude changes of the device. In implementations in which movement of the document is elicited, no attitude changes of the document are explicitly requested. If such changes in document orientation occur during movement along a requested trajectory, they are not deliberate on the part of the user, or they may result from a requirement to keep the document within a field of view of the camera while moving along the desired trajectory. In general, the methods do not involve deliberate translation of the document in its own plane during the image capture phase.

The trajectories are designed to capture holographic information which may not be detected by the device sensor along a straight axial motion. The need for such trajectories is determined by the hologram type, and whether the document includes multiple holograms whose response to illumination is to be captured. The length of the trajectory required depends on factors such as the size of the document, the spatial extent and relationship between items of interest on the document, such as a photograph and a hologram, the relative position of the illuminator and the sensor on the device, and the nature of the ambient illumination. In various implementations, the trajectory is in the 1-3 centimeter range, 3-10 centimeter range, 10-30 centimeter range, and greater than 30 centimeters. The trajectory may be specific to a particular document type, e.g., a driving license or a passport, which may be identified at the beginning of the process. Such identification could be performed automatically or entered by the user. A generic path may be used if the document type is not identified, or if there is no specific knowledge about the document type.

Figure 1A:
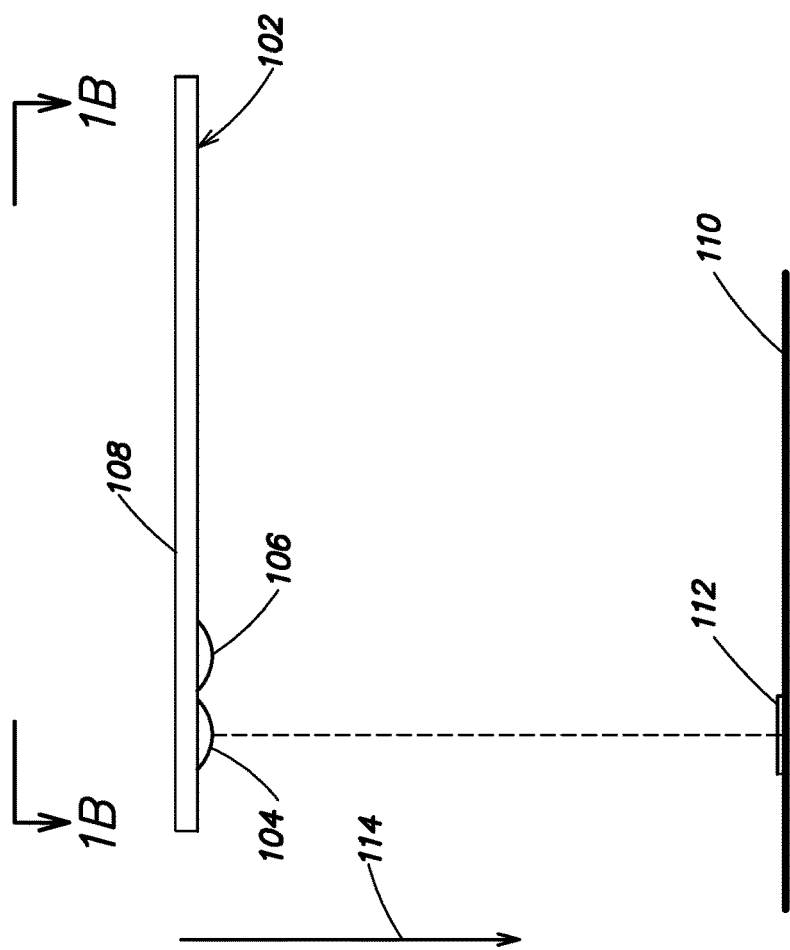
FIG. 1A illustrates axial scanning of a document along a linear trajectory using a smartphone.

In one implementation, the technique involves a single pass along the orthogonal axis, as illustrated in FIG. 1A. Smartphone 102 is equipped with rear-facing camera 104 and illuminator 106. Display 108 is located on the other side of the smartphone. Identity document 110 is positioned in front of the camera such that its photograph 112 is positioned at or near the center of the camera field of view. The user is then instructed to move the phone towards the document, as indicated by arrow 114. In order to help the user perform the motion required, the document is displayed on the device screen, as shown in FIG. 1B, which is a diagrammatic view of the display side of the device. One method of guiding the user involves issuing an instruction by text or voice to keep the document aligned by keeping displayed image 120 of document 110 within box 116 displayed on the screen. The guidance may also request that the displayed image of the photograph 118 be positioned on the screen as requested. As the device moves closer to the document, the size of the box is expanded to account for the enlarged image size.

To create more complex paths, the same request to keep the document within the box may be issued to the user while changing the position of the box on the screen as the user moves the device. Alternatively, the position of the box on the device screen may be fixed but the image of the document is processed to introduce a displacement before it is displayed. For example, to cause the user to move the device as shown in FIGS. 1A and 1B to right, the captured image of the identity document is displaced to the right in the display. The user responds by moving the phone to the right to move the displayed image leftwards into the box.

The cues provided to the user to cause them to move the device are adjusted to maximize the visibility and quality of data captured of the region of interest in the identity document. In a common use case, the region of interest is a hologram. The presence and, in some cases, also the spatial extent of the hologram may be determined before the device motion is initiated.

During such movement, the illumination of the document is provided or augmented by the device. In the case of a smartphone, the rear illuminator ("flash") is turned on and illuminates the document. To defend against replay attacks, a sequence of illumination (i.e., the flash illuminator being turned off and on in a given sequence or continuously modulated according to a pattern) is provided by the server or randomly selected by software running on the smartphone to prevent spoofing by replay attacks, as described, for example, in U.S. Pat. No. 9,075,975, which wholly incorporated herein by reference. In certain situations, the document is not illuminated by the device, and other sources of illumination incident on the document are relied upon.

In the case of a device equipped only with a front-facing camera, such as a tablet or PC, the screen of the device is used to illuminate the document. In various implementations, the screen displays patterns of varying intensity and varying color. These patterns may be static, or they may change. When using such devices, particularly when using a laptop or desktop monitor equipped with a built-in or separate camera, the document is moved while the device is stationary. The user is asked to place the document in front of the camera, guided by feedback on the screen, and to move the document as guided by the device via the screen or via audio cues. The movement thus elicited may be random or may adhere to a predetermined trajectory while illumination from the screen is provided at various locations on the screen in a controlled manner. This serves to adjust the angle of the primary light source relative to the document. The illumination on the screen may be black and white, grayscale, or colored.

In addition, the source of illumination may be modulated in intensity and/or in color during the process, with a temporal intensity and color pattern chosen to avoid the risk of stimulating an epileptic fit in a vulnerable person, following the guidelines of the W3 Consortium WCAG2.0 guidelines. The purpose of the modulation is primarily to impose a visual timestamp on the captured imagery of the document, to prevent the reuse of stolen recordings of genuine identity documents.

The illumination from the flash illuminator or the device screen is localized and illuminates points on the surface of the identity document and any hologram it may contain with intensities and colors that are dependent on the relative positions of each point and the source of illumination, whether it be a point source as with a flash illuminator, or an extended source as with the displayed pattern on the device screen. The angle of the reflection received by the camera from a point on the surface of the identity document depends on the relative position of the camera and the point on the surface of the document. As the distance and angle between the illumination source, with its associated camera, and the document changes, the changing combinations of the angles of incidence and reflection create changes in the reflection detected by the camera. It is these changes that form the basis of the axial scanning methods.

If the device is being moved, the information from the motion sensors on the device, such as the gyro and the accelerometer, may be read and used to augment or corroborate visual information about the changes in the distance between the device and the document. Such methods of establishing consistency between measured motion of the device, and the imagery being captured during the motion are described in U.S. Pat. No. 9,412,169, which is wholly incorporated herein by reference.

In certain embodiments, the patterns on the screen of the device are changed during a period of time while imagery of the document is captured, thus causing the illumination of the document to vary. The document may be motionless with respect to the device throughout the scanning process, or it may be moved during the period of scanning.

In various implementations the imagery from the camera is processed locally or sent over a network to servers for processing. The imagery may be compressed before being transmitted to the servers, for example by industry-standard algorithms such as H.264, H.265 or VP9. Alternatively, some features may be processed locally, and then the partially processed imagery may be sent back to servers for processing. When local processing is performed, the features being used in forgery analysis are concealed so as to prevent revealing this information to an attacker attempting to determine the characteristic features necessary to pass, and then replicate them in a forgery. Substantial local processing may be undertaken when the gains in speed or reliability are deemed to outweigh any additional risk thus incurred.

The information about the nature of the document is obtained by continuous capture while moving the device and/or the document. During the course of a given scan, most of the captured information may be represented in the differences between successive images, i.e., in difference images. The amount of data uploaded to a server may be reduced by using the device to obtain such difference images and transmitting difference images to the server.

In parallel, the process of axial scanning also provides a range of information about the printed information on the document. Using established methods of image enhancement known as super-resolution, the quality of the document image may be improved above what would be available from any individual image. This helps compensate for flaws in focus or blurring and enables an increased accuracy in the optical character recognition (OCR) process used to extract information from the document.

Once the difference frames have been extracted, they may be used to construct a composite image of the surface reflectivity of the document. The composite image is formed by combining the difference images, such as by taking the mean, and then performing noise reduction and saturation thresholding. This produces a map of the composite image indicating where the greatest changes occur, both in luminance and chroma resulting from the axial scanning. Since a hologram produces large changes in appearance with a small motion of the camera position with respect to the ID whereas the rest of the document image does not, the map may be used to determine whether a hologram is present on the ID surface, and if there is a hologram, what area it covers.

The analysis of the composite image is used to determine the likelihood of one or more of the following: a hologram is present; a detected hologram is complete, and not, for example, partially covered by a replacement photograph; and a detected hologram is correct in that it contains no flaws that may indicate a forgery.

The magnitude of the change in appearance of the captured imagery as the sensor and light source move, is greater for holographic content than non-holographic content. The choice of trajectory is based on generating sufficient differences to discriminate between holographic content and non-holographic content. The composite image provides a useful estimate of the holographic content, obtained by separating out the rapidly changing and/or colored aspects of the difference images. This is compared to the expected appearance from a reference document and the following three tests, referred to above, may be performed. The presence test checks whether there is any holographic content. The completeness test uses a spatial map of the reference hologram and counts the regions where presence is detected. The correctness test performs template matching of the reference hologram against the extracted hologram.

The tests are designed to distinguish several types of document forgery. If a whole document is copied, such as by a color copying machine, a hologram will be absent. This is addressed by the presence test. If a copy of a facial image is superimposed on an original document, the result will be a partial hologram outside the region of the face (the rest being covered by the superimposed image.) This is addressed by the completeness test. If a document copy also includes a hologram, such as a replica of a genuine hologram, or a cutout of another document with a hologram, a hologram may be present in both the facial region and in the background region of the document. However, the hologram will not have the correct appearance. This is addressed by the correctness test.

This process may be undertaken by analytical methods, or by machine learning classifiers. The regions of the document are split into holographic content, non-holographic content that resembles the expected material of a genuine document and other material (which may indicate that a document has been copied or doctored). Once the surface reflectivity of the document has been reconstructed, it is compared with the known surface reflectivity of a genuine document. This comparison is best undertaken using a machine learning classifier, such as a convolutional neural network.

One region of a document that may reveal evidence of tampering is the region around the edge of a photograph. For example, if the genuine photograph has been replaced by another photograph, or if another photograph is affixed to the document on top of the genuine photograph, the measured document reflectivity may be affected by changes in the surface shape such as a lip at the edge of the photograph which may change the reflectivity as a function of the angle of illumination and reflection even if the intrinsic surface optical properties are unchanged. Alternatively, the tampering may result in changes in the intrinsic reflectivity of the document surface, such as that caused by changes in the document surface material. Examples include adhesives, dyes, or changes caused by the application of heat. The presence of a discontinuity in the document reflectivity yields a characteristic signature in the captured imagery which may be indicative of tampering.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism. The computer system may be implemented as a portable device such as smartphone, tablet, or laptop computer.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of determining whether a document is genuine, the method comprising:
    illuminating the document with a controlled illumination source which is in a fixed spatial relationship with a camera;
    changing the distance between the camera and a centroid of the document, wherein the distance change includes a change in a distance between the camera and the centroid of the document along an axis perpendicular to a plane of she document;
    using the camera to capture imagery of the document while changing the distance between the camera and the centroid of the document;
    analyzing the captured imagery to obtain information about changes in appearance of a surface of the document resulting from:
        changes in illumination incident on the document caused by changing a position of the controlled illumination source with respect to the document; and
        changes in a position of the camera with respect to the document caused by the changing of the distance between the centroid of the document and the camera; and
    analyzing the information about changes in appearance of the document to determine a likelihood that the captured imagery was captured from a genuine document.

2. The method of claim 1, wherein the distance between the camera and the centroid of the document is changed by moving one of the camera and the document along a linear trajectory.

3. The method of claim 2, wherein an angle between the linear trajectory and a plane of the document is less than 90 degrees.

4. The method of claim 1, wherein the distance between the camera and the centroid of the document is changed by moving one of the camera and the document along a curved trajectory.

5. The method of claim 1, wherein:
    the camera and the controlled illumination source are components of a mobile device;
    the distance between the camera and a centroid of the document is changed by a user of the mobile device; and the user of the mobile device is instructed to move the device while keeping an image of the document displayed on a screen of the device within a specified region on the screen.

6. The method of claim 5 further comprising using the mobile device to displace the image of the document displayed on the screen of the device such that the user of the mobile device causes the mobile device to move in a desired trajectory corresponding to a trajectory in which the user of the mobile device keeps the image of the document displayed on the screen of the device within the specified region on the screen.

7. The method of claim 1 wherein the captured imagery includes imagery of a photograph within the document, and the step of analyzing the information about changes in appearance of the surface of the document includes analyzing changes in reflections from a region of the document coincident with the photograph to determine a likelihood that the captured imagery of the photograph was captured from a photograph that is not an altered photograph or a replacement photograph.

8. The method of claim 1 wherein the captured imagery includes imagery of a region adjacent to a photograph appearing within the document, and the step of analyzing the information about changes in appearance of the surface of the document includes analyzing changes in reflections from the region adjacent to the photograph to determine a likelihood that the region adjacent to the photograph was affected by at least one of alteration of the photograph and replacement of the photograph.

9. The method of claim 1 wherein the controlled source of illumination comprises a display screen.

10. The method of claim 9, wherein the display screen displays a pattern.

11. The method of claim 9, wherein the display screen displays a changing pattern that is controlled by at least one of a device local to the document and a remote server in data communication with a device local to the document that houses the display screen.

\* \* \* \* \*